United States Patent [19]
Marlowe

[11] 4,080,630
[45] Mar. 21, 1978

[54] LINE SCAN CONVERTER FOR AN IMAGE DISPLAY DEVICE

[75] Inventor: Frank Jerome Marlowe, Kingston, N.J.

[73] Assignee: RCA Corporation, New York, N.Y.

[21] Appl. No.: 740,770

[22] Filed: Nov. 10, 1976

[51] Int. Cl.² .............................................. H04N 5/68
[52] U.S. Cl. ..................................... 358/242; 313/422
[58] Field of Search .................. 313/422; 358/65, 160, 358/188, 242

[56] References Cited
U.S. PATENT DOCUMENTS 3,725,578   4/1973   Brown et al. ..................... 358/242 X

*Primary Examiner*—Robert L. Richardson
*Attorney, Agent, or Firm*—Eugene M. Whitacre; George E. Haas

[57] ABSTRACT

The brightness signal for an image display device is digitally processed using an analog to digital converter to translate the signal into digital words. A primary shift register is connected to the output of the analog to digital converter. The primary shift register has a stage capable of containing a digital brightness word for each element in the display line of the device. The primary shift register has a plurality of parallel outputs being spaced X number of stages from each other. Each output is connected to a separate secondary shift register which has X stages.

5 Claims, 2 Drawing Figures

LINE SCAN CONVERTER FOR AN IMAGE DISPLAY DEVICE

BACKGROUND OF THE INVENTION

The present invention relates to image display devices and more particularly to systems converting a standard image brightness signal for use in modular scanning display devices.

Recently display devices have been proposed wherein the device is formed with a plurality of modules each having its own electron beam which scans a portion of the screen of the device as shown in U.S. patent application Ser. No. 615,353, filed Sept. 22, 1975, by C. H. Anderson, now U.S. Pat. No. 4,028,582. Since the electron beams simultaneously scan the screen, brightness signals for conventional displays, such as the NTSC television video signal standard, must be converted into individual brightness signals for modulating the beams in each module before such display devices can be used with conventional signals.

SUMMARY OF THE INVENTION

A line scan converter for a modular image display device comprises an analog to digital converter for translating the image brightness signal into digital words. A primary shift register is connected to the output of the analog to digital converter. The primary shift register has one stage for each element of the display line of the device which is capable of storing a digital brightness word. The primary shift register has a plurality of parallel outputs spaced X stages from one another. A separate secondary shift register having X stages is connected to each output of the primary shift register.

DETAILED DESCRIPTION OF THE PREFERRED EMBODIMENT

Figure 1:
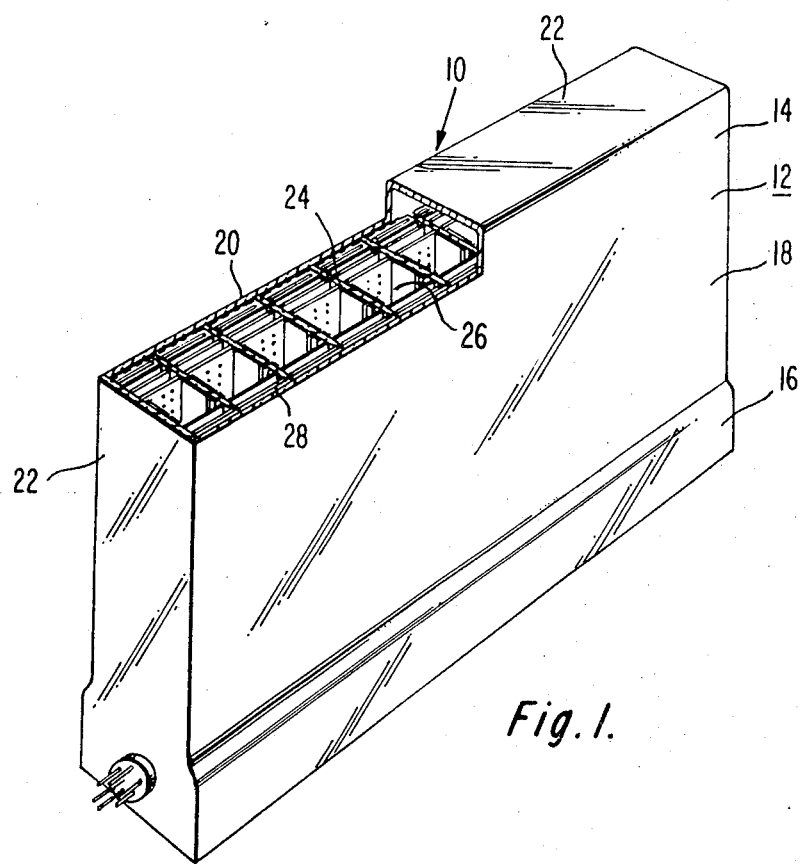
FIG. 1 is a paritally cut away perspective view of a modular image display device.

Referring to FIG. 1, a flat display device including a scan deflection structure is generally designated as 10. The display device 10 comprises an evacuated envelope 12, typically of glass, having a display section 14 and an electronic gun section 16 and is similar to the display described in U.S. patent application Ser. No. 615,353, ⊕filed by C. H. Anderson on Sept. 22, 1975, now U.S. Pat. No. 4,028,582. The display section 14 includes a rectangular front wall 18 and a rectangular back wall 20 in spaced parallel relation to the front wall. The front wall 18 and the back wall 20 are connected by sidewalls 22. The front wall 18 and the back wall 20 are dimensioned to correspond with the size of the viewing screen desired, e.g., about 30 inches by 40 inches (75 cm. by 100 cm.), and are spaced apart typically about 1 to 3 inches (2.5 cm. to 7.5 cm.). The front wall supports a cathodoluminescent screen composed of different color light emitting phosphors.

Extending between the front and back walls 18 and 20 are a plurality of supporting walls 24 made of an electrically insulating material such as glass. The supporting walls 24 provide the internal support for the evacuated envelope 12 against the external atmospheric pressure, and divide the display section 14 into a plurality of modular channels 26. Each channel 26 has three electron beams which originate in the gun section 16 and scan the portion of the viewing screen 28 between the adjacent supporting walls 24. Each of the three beams excites the light emitting phosphors of a different color within each module. In this fashion, the viewing screen of the display device 10 is divided into a number of regions which are simultaneously scanned by the electron beams in the channels. In order to reduce the inter-module capacitance, the beams in adjacent modules scan in opposite directions as described in U.S. patent application Ser. No. 691,397, filed on June 1, 1976 by Frank Marlowe. The beams in the first channel scan left to right while the beams in the second scan right to left. The beams in the next channel scan left to right and so on, across the entire display.

Since the beams in each channel are simultaneously scanning the viewing screen, the conventional NTSC television signal must be processed so that the video information or brightness signal may be simultaneously supplied to each channel 26 rather than serially supplied as in conventional cathode ray tubes.

Figure 2:
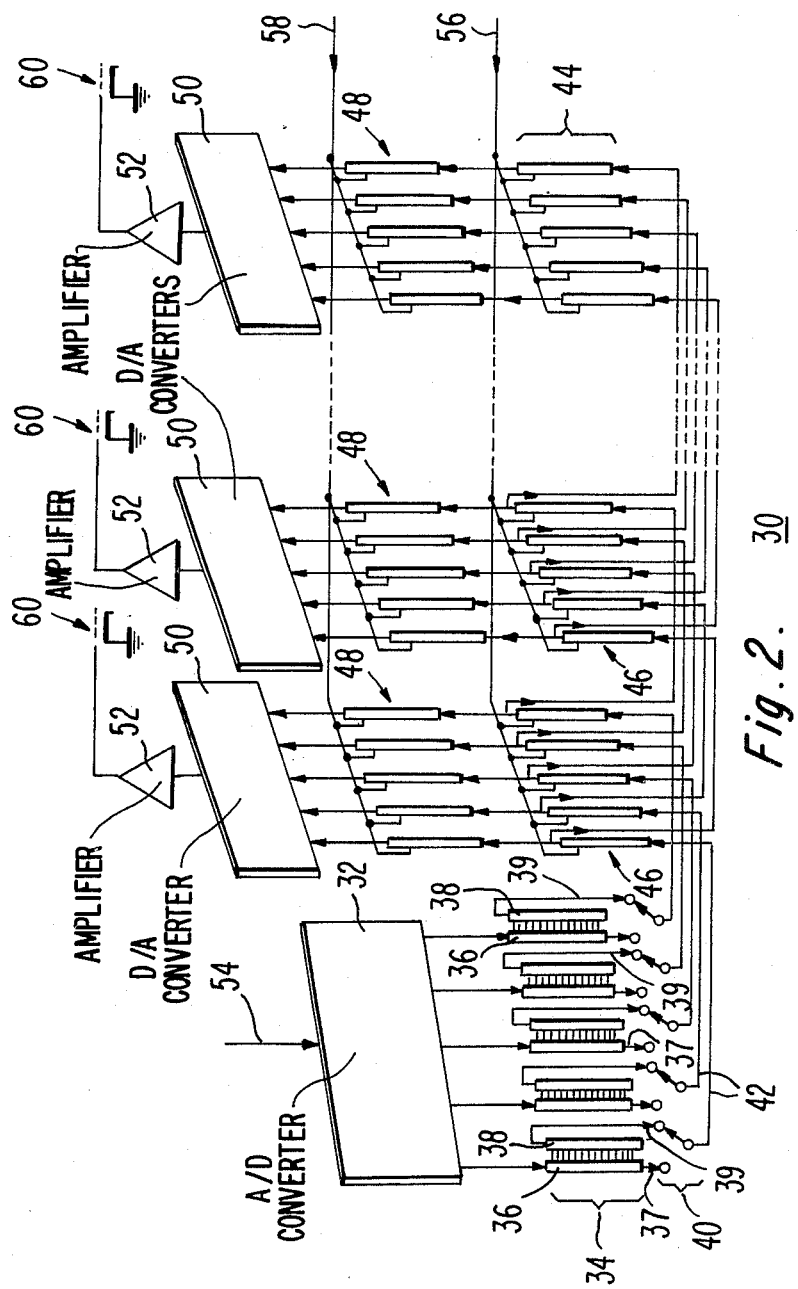
FIG. 2 shows a line scan converter for use with the modular image display device in FIG 1.

As shown in FIG. 2, the line scan converter generally designated as 30 is employed to control all of the electron guns 60 corresponding to the electron beams for one color in the entire display. Therefore, three such circuits would be utilized for a color display device. The present system can be adapted to a monochrome display where only one circuit is needed. The converter 30 utilizes a five bit analog to digital (A/D) converter 32 whose output is connected to a reversing shift register, generally designated as 34. The reversing shift register 34 includes a first shift register 36 and a second shift register 38 for each output bit from the analog to digital converter 32. The serial input of each of the first shift registers which has both a serial and a parallel output is connected to the A/D converter 32. The second shift registers 38 are parallel in/serial out and have their parallel inputs connected to the parallel outputs of a different first shift register 36. A plurality of switches 40 alternatively connect an output line 42 with either the serial output 37 of one of the first shift registers 36 or the serial output 39 of the corresponding second shift register 38. The output lines 42 feed to a primary shift register 44 which has a plurality of stages equal to the number of picture elements of a single color in a line of the display image (approximately 640 stages for an NTSC television display device). Each stage stores one digital word for each line element. The primary register 44 is divided into segments 46 corresponding to each channel of the display device. For example, a display for the NTSC standard may have forty channels 26 each illuminating sixteen image elements of each color in every line. Therefore, there would be forty segments in the primary register with sixteen stages in each segment. Each segment 46 may be a separate serial in/serial out shift register having 16 stages. The primary shift register has a plurality of parallel outputs so that each segment 46 has a separate output which is connected to a separate secondary shift register 48. Thus there is one secondary shift register 48 for each segment 46 of the primary shift register 44. The output of each of the secondary shift registers 48 feed the gun control circuit in each channel 26. For example, the gun control circuit can comprise a digital to analog converter 50 and an amplifier 52.

The conventional NTSC video signal enters the A/D converter 32 on line 54 and is converted to a five bit digital word. Words having larger number of bits may be used to provide finer gradation of the digitized brightness signal. Each bit in the digital word is fed out of the converter 32 and into the reversing register 34. As noted previously, adjacent modules or channels in the display scan in opposite directions. Therefore, the brightness signal must be reversed for every other channel. The brightness signal entering the first shift register 36 is read out serially for the first channel by having the switch means 40 connect the bus lines 42 to the serial output of the first shift register 36. The first sixteen words are processed directly through the first shift registers 36 to the bus lines 42 without passing through the second shift registers 38. The brightness signal for the second channel 26 must be reversed in order to accomodate the reverse scan in that channel. To accomplish this, the next sixteen words of the brightness signal, which are for the next channel are fed from the first shift registers 36 to the second shift registers 38 in parallel form. When these words flow out of the second shift registers, they are in the reverse order that they were fed into the first shift register 36, i.e., the first word into the first shift register 36 is the last word out of the second shift register 38. The switches 40 have changed state so that the output of the second shift register 38 is connected to the bus lines 42.

The digital brightness signal is then serially fed through the stages of the primary shift register 44 until all of the 640 stages are filled with the brightness words for an entire line. At this point the 16 stages in each segment 46 contain the brightness signals for the scan in each channel 26. During the next horizontal retrace of the display, clock pulses on line 56 and line 58 shift the sixteen words in each segment 46 of the primary shift register 44 into the corresponding secondary shift register 48. During the next line scan, each word in the secondary shift register 48 for each channel's gun is clocked out of the secondary clock register 48 by a clock signal on line 58. These words are fed into the corresponding digital to analog converter 50 amplified by the amplifier 52 and fed to the guns schematically shown as 60. At the same time that the brightness words are being fed out of the secondary shift register 48, the digitized brightness signal for the next line is being processed through the analog to digital converter 32, the reversing register 34 and the primary register 44.

The line scan converter of the present invention divides the conventional serial modulation signal into segments for each channel 26 of the display device 10. In addition, it reverses the order of the signal for alternating channels 26 to enable the reversed scan in the tube. By using separate serial in/serial out shift registers for each segment of the primary shift register and for the secondary shift register, parallel input and output shift registers have been eliminated thereby reducing the cost of the system. The clocking of the data through the converter also has been simplified since the same clocks which transfer data into and out of the primary and secondary shift registers also transfer data between them.

I claim:

1. A line scan converter for an image display device for converting an analog video brightness signal for a line of the image into a plurality of segments which may be simultaneously fed to the display device, said converter comprising:

an analog to digital converter for digitizing the analog brightness signal for the line of the display into a plurality of digital words, where each word being a representation of the brightness signal for a given picture element;

a primary shift register for storing the digital brightness words for the line of the image, the primary shift register having one stage for each digital word in the image line, the input of the primary shift register being connected to the output of the analog to digital converter, the primary shift register having a plurality of parallel outputs being spaced X stages from one another; and a separate secondary shift register connected to each parallel output of the primary shift register, each secondary shift register having X stages for storing the digital image brightness words from one set of X stages of the primary shift register, the secondary shift registers having outputs for simultaneously feeding the contents of each of the secondary shift registers to the image display device.

2. The converter as in claim 1 wherein the primary shift register comprises a plurality of serial in/serial out shift registers consecutively connected and each having X stages.

3. The converter as in claim 1 further comprising:
a reversing shift register between the analog to digital converter and the primary shift register.

4. The converter as in claim 3 wherein the reversing shift register comprises:
a first shift register having a serial input and both a serial and parallel output; and
a second shift register having a parallel input connected to the parallel output of the first shift register and having a serial output.

5. The converter as in claim 4 having means for switchably connecting the input of the primary shift register with the serial output of the first shift register or the serial output of the second shift register.

* * * * *